United States Patent [19]

Cheng et al.

[11] 4,451,445
[45] May 29, 1984

[54] METHOD FOR CONTROLLED HYDROGEN CHARGING OF METALS

[75] Inventors: Bo-Ching Cheng; Ronald B. Adamson, both of Fremont, Calif.

[73] Assignee: General Electric Company, San Jose, Calif.

[21] Appl. No.: 413,534

[22] Filed: Aug. 31, 1982

[51] Int. Cl.³ ............................................... C01B 6/02
[52] U.S. Cl. ..................................... 423/645; 420/900
[58] Field of Search ......................... 423/645; 420/900

[56] References Cited

FOREIGN PATENT DOCUMENTS 1433526 4/1976 United Kingdom.

OTHER PUBLICATIONS

Pick et al., "Physical Review Letters", vol. 43, 1979, pp. 286–289.
Boes et al., "Zeit. fur Naturforschung," vol. 31a, 1976, pp. 754–759.

*Primary Examiner*—Herbert T. Carter
*Attorney, Agent, or Firm*—Ivor J. James, Jr.; Raymond G. Simkins; Samuel E. Turner

[57] ABSTRACT

A method for controlling hydrogen charging of hydride forming metals through a window of a superimposed layer of a non-hydriding metal overlying the portion of the hydride forming metals to be charged.

11 Claims, 1 Drawing Figure

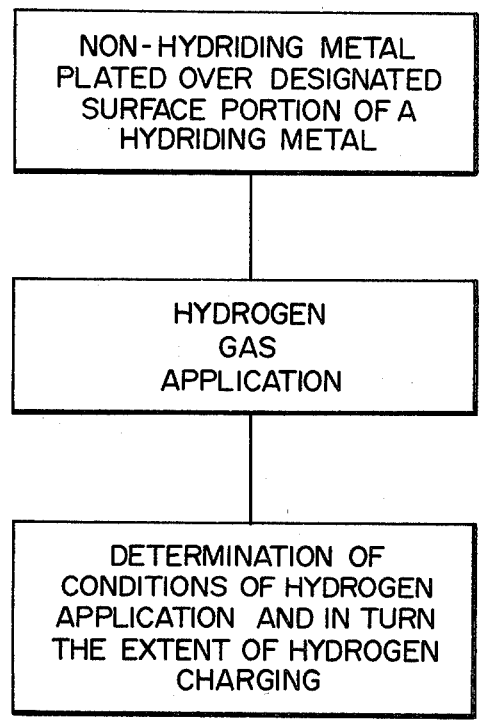

4,451,445

METHOD FOR CONTROLLED HYDROGEN CHARGING OF METALS

FIELD OF THE INVENTION

This invention relates to metal hydrides and their formation. It is particularly concerned with the effects of hydrogen upon certain metals and means for ascertaining same.

BACKGROUND OF THE INVENTION

The Government of the United States has rights in this invention pursuant to Subcontract No. 3-20-46 under Prime Contract No. DE-AC02-77ET34001 awarded by the U.S. Department of Energy.

Metals which are exposed to gaseous hydrogen or aqueous corrosive media can take up hydrogen from such environments. The amount of hydrogen that can dissolve in typical engineering metals such as iron, aluminum and copper is limited by its solubility in such metals, and typically is only in the parts per million range at room temperatures.

However, with many significant transition metals such as zirconium, titanium, hafnium and their alloys, hydrogen can form solid hydride phases in their metal matrix. The presence of hydrogen within these metals, or the hydrides formed thereby, can cause embrittlement therein, and under some conditions result in their failure.

Investigation of the effect of hydrogen upon the mechanical and physical properties of metals requires a reproducible method of charging controlled amounts of hydrogen into metal being studied. Also, in systems wherein hydrogen is stored in sold form, there is a need for efficient means of charging the hydrogen into a host metal.

The most direct method for charging hydrogen into a metal that forms hydrides is to simply expose the metal to a dry hydrogen environment in an enclosed chamber at a temperature of about 200° to 500° C. See *Transition Metal Hydrides*, ed. by E. L. Muetterties, Marcell Debber, Inc., New York, 1971, page 14. This method of hydriding is extremely sensitive to impurities in the environment, particularly water vapor, and requires a high vacuum before hydrogen gas can be introduced into the system. Also, the surface of the metal must have all oxide removed, which is especially difficult with active metals such as zirconium or titanium.

Moreover, metal hydrides initially form at the surface of the metal and migrate gradually into the interior thereof. Volume expansion due to hydride formation within the metal can produce spalling and complicate hydrogen charging whereby the rate of the charging is unpredictable. Accordingly, this procedure is only practical for producing metal hydrides in metal particle form, such as metal chips, and is not suitable for charging controlled amounts of hydrogen or for forming metal hydrides with a metal body of specific geometry.

Laboratory methods for charging controlled amounts of hydrogen to metals require delicate equipment set-ups, note Wienstein and Hotz, Transaction of ASM, Vol. 57, 1964, page 254. The metal samples must be heated to high temperatures, for example, zirconium and its alloys is heated to over 850° C. where it undergoes a phase transformation which increases its capacity for dissolving greater quantities of hydrogen. Controlled amounts of hydrogen gas are applied to the heated samples whereupon they are cooled to retain all hydrogen dissolved therein while hot.

Although such high temperature techniques can produce controlled quantities of hydrogen within a metal matrix, the microstructure and in turn the physical and mechanical properties of the metal sample will be altered by the high temperatures of the treatment.

Another method of charging hydrogen into a metal is to corrode the metal in a corrosive environment, such as aqueous lithium hydroxide (LiOH) with zirconium and its alloys at temperatures of about 300° to 400° C. See "Corrosion And Hydrogen Pickup Of Zircaloy In Concentrated Lithium Hydroxide Solutions" by Kass, *Corrosion*, Vol. 25, No. 1, January 1969. The corrosion reaction generates hydrogen which in part enters the metal. However, the reproducibility of this technique is uncertain because of the variable susceptibility of metals to corrosion, and the corrosion attack can deteriorate the surface of the metal.

BRIEF DESCRIPTION OF THE DRAWING

The drawing comprises a flow sheet diagram illustrating the basic steps for the practice of the method of this invention.

SUMMARY OF THE INVENTION

This invention comprises a procedure for the substantially exclusive application of hydrogen gas or its isotopes comprising tritium and deuterium, to a selectively defined surface area of a hydridable metal or article thereof, and in a controlled, determinable quantity. The deposition of a thin layer or plating of a non-hydriding metal such as copper only over the hydriding metal surface portion of the selectively defined area effectively confines the hydrogen gas permeation to such area while inhibiting the permeation of other gaseous materials such as water vapor or oxygen. By measuring given conditions of the procedure, the amount of hydrogen gas penetrating the selectively defined area of the metal can be determined and in turn controlled.

OBJECTS OF THE INVENTION

It is a primary object of this invention to provide a method for charging of hydrogen or its isotopes to metals wherein the quantity of hydrogen applied is controllable.

It is also an object of this invention to provide a method for applying hydrogen gas selectively to a defined area of a metal surface, and to the exclusion of other gases of the immediate atmosphere.

It is another object of this invention to provide means for investigating the effects of hydrogen upon metals, and structures thereof.

It is another objective to provide a method for producing transition metal hydride components of any geometry with the least dimensional distortion.

It is a further object of this invention to provide a method for the reproducible charging of hydrogen gas in controlled amounts for evaluating any changes in the chemical or physical properties of metals attributable to hydrogen.

It is another object of this invention to provide an efficient method of charging hydrogen into metals for the purpose of storing hydrogen.

DETAILED DESCRIPTION OF THE INVENTION

This invention comprises a unique method for charging hydrogen, including its isotopes, to hydride forming metals, such as, for example, zirconium, titanium, hafnium and their alloys. The method includes the application of a thin layer of a non-hydriding metal such as copper over the portion of ametal surface to be subjected to the hydriding action, and then subjecting such portion to hydrogen gas at elevated temperatures.

In accordance with this invention, the surface portion of the hydride forming metal, or of an article formed of such metal, is thoroughly cleaned to render it receptive to the application of a thin metal layer thereover, such as by plating or other conventional techniques for metal bonding.

For instance, the portion of the surface of the hydride forming metal can be prepared by etching with a hydrogen fluoride and nitric acid solution, e.g., about 2-5% HF and about 30-50% HNO$_3$ with the balance water, or by other common metal pickling procedures.

A thin layer of a non-hydriding metal, such as copper, is then applied over the cleansed surface portion of the metal to be subjected to a hydriding treatment. Conventional metal plating processes can be used for the application of the thin metal layer, comprising for example, electrolytic or electroless procedures, such as disclosed in U.S. Pat. Nos. 4,017,368 and 4,093,756.

In accordance with a preferred embodiment of this invention, the thin metal layer such as copper applied to the hydriding metal surface, should be about 4 to about 20 microns in thickness, and typically about 10 to 15 microns.

Upon the application of such a thin layer of non-hydriding metal over the surface portion of the hydriding metal, the said composite is exposed to hydrogen gas at elevated temperature. For instance the metal material, or article thereof, can be placed within the enclosure of a furnace and subjected to hydrogen gas. A preferred procedure for this invention comprises applying an ambient temperature of about 200° to about 400° C. (392°-752° F.) within an atmosphere of low pressure hydrogen gas such as supplied with a continuous flow of gas from a hydrogen source into an enclosing chamber. The gas flow can be sustained by burning with a torch arrangement at a gas exit.

In the practice of this invention, the thin layer of copper or other non-hydriding metal overlying the surface of the hydriding metal substrata, functions as a hydrogen diffusion window which enables easy diffusion of the hydrogen gas therethrough on into the underlying metal substrata while at the same time inhibiting diffusion passage therethrough of other gaseous media such as oxygen or water vapor. In other words the thin non-hydrizing metal layer performs as a filter that permits ready passage of hydrogen gas and retards passage of oxygen and water vapor. Thus, a preferential charging of hydrogen by selective diffusion can be attained within the surface area of the hydriding metal provided with the overlying non-hydriding metal layer.

Moreover, any oxide of zirconium, etc. occuring at the interface of the overlying non-hydriding metal layer and the underlying substrata of hydriding metal will rapidly dissolve or become permeable whereby hydrogen gas can penetrate through such an intermediate oxide body.

Further in accordance with this invention, the amount of hydrogen gas charging attained within the given area of the hydrogen diffusion window of the non-hydriding metal layer, can be determined and thereby controlled by measuring and manipulating certain conditions of the charging operation. Specifically, each of the following conditions of the operation should be measured or determined: (1) the thickness of the layer of non-hydriding metal overlying the hydriding metal surface; (2) the ambient temperature of the hydrogen gas application; and (3) the time period of the hydrogen application.

Having ascertained these factors, the flux of hydrogen gas passing through the layer of non-hydriding metal providing the hydrogen window can be calculated when expressed as:

$$J_H = -D_{Cu}^H \frac{\Delta C^H}{d},$$

where $D_{Cu}^H$ is the diffusivity of hydrogen in copper at test temperature, $\Delta C^H$ is the hydrogen concentration difference between copper outer and inner surface (or zirconium outer surface), d is the plating thickness.

Accordingly, the amount of hydrogen gas applied in the charging process can be controlled by manipulating the thickness of the layer of non-hydriding metal, or the temperature of the hydrogen gas application, or the duration of the hydrogen gas application.

Typically, it is most convenient to fix the thickness of the layer of non-hydriding metal overlying the hydriding metal surface and the hydrogen charging temperature, and simply vary the charging time to control the amount of hydrogen gas charged into the hydriding metal.

Charging temperatures at the lower end of the preferred range consisting of about 200° to about 500° C. are more feasible if the quantity of hydrogen gas to be applied is low, such as less than about 100 parts per million. The hydrogen gas flux is limited by diffusion through the layer of non-hydriding metal, and the mobility of hydrogen in hydriding metals such as zirconium alloys is high at temperatures above about 200° C. Thus, the hydrogen gas and in turn hydrides will disperse within the matrix of the hydriding metal rather than concentrating at its surface. This technique accordingly provides for the formation of metallic hydride in any complicated geometry with no significant physical distortion of the specimen undergoing evaluation. The charging technique of this invention also constitutes an economical method for producing metal hydrides.

Moreover, if hydrogen gas charging is desired only for certain or limited surface areas of the hydriding metal, or article thereof, or if hydrogen charging is unneeded or detrimental in given surface areas thereof, a layer of the non-hydriding metal can be applied only onto a selected portion or portions of the surface of such hydriding metal or the article, with the remaining surface portions free of any overlying metal layers. Then, the hydrogen gas is applied by first passing it through water whereby it picks up water vapor before contacting the metal. The water vapor thus entrained in the continuous supply of hydrogen gas is sufficient to passivate the exposed surface of the hydriding metal devoid of the layer of non-hydriding metal, whereby hydrogen gas is precluded from entering such exposed surfaces. Thus, as a pracitical matter, the hydrogen gas only enters the hydriding metal surface through the window provided by the layer of non-hydriding metal.

EXAMPLES

Test specimens were ~1" long, half rings of 8×8 zirconium alloy namely Zircaloy-2 of a composition disclosed in U.S. Pat. No. 2,772,964.

The test specimens included samples of copper plated over the inside diameter of the Zircaloy-2 tubing half rings.

The tubing test specimens were placed in a pyrex glass tubing installed in a Lindberg tube furnace. The temperature of the furnace was measured with a Chromel-Alumel thermocouple, and was recorded with a strip chart recorder. A wet hydrogen gas mixture was produced by passing 1 atmosphere hydrogen gas through a bubbler containing distilled water at room temperature (22° C.). The hydrogen flow rate was controlled at about 330 cc/min by the flowmeter. The $H_2/H_2O$ ratio was calculated from the electrochemical potential outputs of the oxygen meter. The hydrogen gas was finally burnt at a torch at the line outlet. Before testing was started, the test line was continuously flushed with nitrogen gas for 2 hours to remove any residual oxygen.

Two series of tests were carried out. In the first test, tubing samples were exposed to a wet hydrogen environment having $H_2/H_2O \sim 33 \pm 5$ at $355° \pm 8°$ C. for 72 hours. In the second test, the $H_2/H_2O$ ratio was $\sim 18 \pm 5$, temperature 400° C., and test duration 360 hours. The difference in $H_2/H_2O$ in the above tests is likely to be due to the change in the test temperature.

Post-test evaluation included mainly metallographic examination. Neutrographic examination was also carried out.

RESULTS AND DISCUSSION

(1) 355° C.—72 Hour Test

The wet hydrogen environment contained water vapor at about 0.45 psig partial pressure ($H_2/H_2O \sim 33$), which significantly exceeded the reported minimum value for inhibiting Zr-2 hydriding, 0.002 psig. This was confirmed from metallographic examination of the autoclaved sample, showing no accelerated hydriding. A vapor deposited nickel film on an autoclaved test sample, which presumably would accelerate surface hydrogen dissociation, was shown to have no siginficant effect in hydrogen pickup of the zirconium alloy sample.

Three samples with copper plated on pickled surface were found to form hydride platelets. The hydrided samples all had a thin massive hydride layer of up to about 10 m at the interface between the Zircaloy and the copper layer. The equivalent hydrogen content estimated from the density of uniform hydride platelets is about 300 ppm for all of the three samples. The interface oxide in the sample with copper plated on an autoclaved tubing was found to effectively prevent hydrogen from entering the cladding. The protection by this interface oxide is, however, believed to be only temporary as will be discussed later.

The autoclave treament of a sample with copper plated on a pickled tubing resulted in some interesting features. It can be seen that the copper surface is shining and free of any tarnish. A continuous interface layer, presumably an oxide, was formed by the autoclave treatment and the copper barrier was still visually intact. Hydrogen pickup test of this sample showed that it also resisted hydriding attack similar to the sample with copper plated directly on an autoclaved tubing.

(II) 400° C.—360 Hour Test

The post test surface appearance of the ten samples tested was investigated. In this test, the partial pressure of water vapor, about 0.8 psig ($H_2/H_2O \sim 18$) is slightly higher than the value used in the 355° C.—72 hour test. The difference in $H_2/H_2O$ ratio was not expected to result in any significant influence in the hydriding of Zircaloy-2. Micrographic examination again showed that in this passive environment all Zircaloy samples without a copper plating, i.e., autoclaved, pickled, oxidized, and pickled plus a 50Å Platinum film, were resistant to hydriding attack.

Samples with copper plating on either pickled, oxidized, or autoclaved tubing were heavily hydrided. Some of the hydrides, exhibit cellular structure. On the sample with copper on pickled tubing, an oxide-like layer was found beneath the copper barrier, suggesting that oxidant has probably diffused across the copper barrier or from specimen edges to form a zirconium oxide film as similar to the autoclave treatment discussed previously. Presence of the interface oxide during testing, however, did not prevent hydrogen from entering the Zircaloy. In fact, the preformed autoclaved or oxidized oxide films beneath the copper barrier all remain visually intact while hydriding of the Zircaloys beneath the oxide films occured. The interface oxide however seems to retard hydrogen entry to the Zircaloys, where the density of hydrides decreases with increasing oxide thickness.

The difference in the results of the copper on autoclaved samples tested at 355° C. and 400° C. suggests that the interface oxide provided transient protection to the Zircaloy. Lacking in oxygen supply from external sources, the $ZrO_2$ oxide will gradually become substoichiometric due to diffusion of oxygen into the Zircaloy. The sub-stoichiometric $ZrO_2$ oxide has been proposed to be permeable to hydrogen, leading to hydriding of Zircaloys. The incubation time for Zircaloy hydriding to occur would therefore decrease with increasing temperature and with decreasing interface oxide thickness. Small changes in the value of $H_2/H_2O$ in the test environment is not likely to have effect in Zircaloy-2 hydriding since it is a diffusion-controlled process.

What is claimed is:

1. A method for the controlled hydrogen charging of hydride forming metals for forming hydrides therein, comprising the steps of:
   a. applying a thin layer of a thickness of about 10 to about 15 microns of copper over the surface of a hydride forming metal comprising zirconium and its alloys;
   b. subjecting the surface of the hydride forming metal with the layer of copper thereon to hydrogen gas while exposed to an ambient temperature of about 200° to about 400° C.; and
   c. determining the amount of hydrogen gas diffused through the thin layer of copper and into the hydride forming metal based upon the measurement of the ambient temperature of the hydrogen gas application, the copper layer thickness, and the duration of exposure to hydrogen gas.

2. A method for the controlled hydrogen charging of hydride forming metals and their alloys for forming hydrides therein, comprising the steps of:
   a. plating copper metal in a thin layer of about 4 to about 20 microns thick over a portion of a surface of a hydride forming metal selected from the group consisting of zirconium, titanium, hafnium, and their alloys;
   b. subjecting the copper plated portion of the hydride forming metal to contact with hydrogen gas while exposed to an ambient temperature within the range of about 200° to about 400° C.; and c. determining the amount of hydrogen gas diffused through the deposited copper layer and into the hydride forming metal based upon the measurements of the ambient temperature of the hydrogen gas application, the copper layer thickness, and the duration of time of exposure to the hydrogen gas.

3. The method of claim 2, wherein the non-hydriding metal is applied over the surface of the hydride forming metal in a layer of a thickness of about 10 to about 15 microns.

4. The method of claim 2, wherein the surface of the hydride forming metal with the non-hydriding metal layer is subject to hydrogen gas while exposed to an ambient temperature of approximately 300° C.

5. The method of claim 2, wherein the hydride forming metal comprises zirconium and its alloys.

6. The method of claim 2, wherein the hydrogen gas is passed through to entrain water vapor therein before contacting the hydride forming metal.

7. The method of claim 2, wherein the amount of hydrogen gas diffused into the portion of the hydride forming metal having the copper plated thereover is calculated with the formula $$J_H = -D_{Cu}^H \frac{\Delta C^H}{d},$$

where $D_{Cu}^H$ is the diffusivity of hydrogen in copper at test temperature, $\Delta C^H$ is the hydrogen concentration difference between copper outer and inner surface, and d is the plating thickness.

8. The method of claim 2, wherein the extent of the hydrogen charging is governed by controlling at least variable comprising the ambient temperature of the hydrogen gas application, the copper layer thickness, and the duration of time of exposure to the hydrogen gas.

9. A method for the controlled hydrogen charging of hydride forming metals and their alloys for forming hydrides therein, comprising the steps of:

a. plating copper metal in a thin layer of about 4 to about 20 microns thick over a portion of a surface of a hydride forming metal selected from the group consisting of zirconium, titanium, hafnium and their alloys;

b. subjecting the copper plated portion of the hydride forming metal to contact with hydrogen gas while exposed to an ambient temperature of within the range of about 200° to 400° C.; and c. determining the amount of hydrogen gas diffused thorugh the deposited copper layer and into the hydride forming metal based upon the measurement of the ambient temperature of the hydrogen gas application, the copper layer thickness, and the duration of time of exposure to the hydrogen gas with the formula $$J_H = -D_{Cu}^H \frac{\Delta C^H}{d},$$

where $D_{Cu}^H$ is the diffusivity of hydrogen in copper at test temperature, $\Delta C^H$ is the hydrogen concentration difference between copper outer and inner surface, and d is the plating thickness.

10. The method of claim 9, wherein the hydrogen gas is passed through water to entrain water vapor therein before contacting the hydride forming metal.

11. The method of claim 9, wherein the extent of the hydrogen charging is governed by controlling at least one variable comprising the ambient temperature of the hydrogen gas application, the copper layer thickness, and the duration of time of exposure to the hydrogen gas.

* * * * *